US006302379B1

(12) United States Patent
Walters

(10) Patent No.: US 6,302,379 B1
(45) Date of Patent: Oct. 16, 2001

(54) DEVICE FOR FACILITATING THREADING OF ELECTRICAL CABLE THROUGH A PIPE

(76) Inventor: Paul A. Walters, 3925 Engle Rd., Fort Wayne, IN (US) 46804

( * ) Notice: Subject to any disclaimer, the term of this patent is extended or adjusted under 35 U.S.C. 154(b) by 0 days.

(21) Appl. No.: 09/569,365

(22) Filed: May 11, 2000

(51) Int. Cl.$^7$ .................................................. B65H 59/00
(52) U.S. Cl. .......................... 254/134.3 FT; 254/134.3 R
(58) Field of Search ................... 254/134.3 R, 134.3 FT, 254/134.3 PA, 389; 242/157 R

(56) References Cited

U.S. PATENT DOCUMENTS

| 3,441,189 | * | 4/1969 | Erb et al. ....................... 254/134.3 R |
| 4,796,865 | * | 1/1989 | Marchette .................... 254/134.3 FT |
| 5,236,177 | * | 8/1993 | Tamm .......................... 254/134.3 FT |

* cited by examiner

Primary Examiner—Robert C. Watson

(57) ABSTRACT

The invention herein is an improved structure for facilitating and easing the process of threading electrical lines or cables into and through the interior of a pipe member comprising a longitudinally extending insert member, such insert member having a rounded undersurface to fit conformingly into the interior of the pipe member, and further wherein such insert member is provided with a channel on the upper surface with such channel having a rounded bottom, and further where such insert member has a downwardly sloped cammed surface on the one end to receive the cable as it moves into the insert member before being drawn into the pipe member.

3 Claims, 3 Drawing Sheets

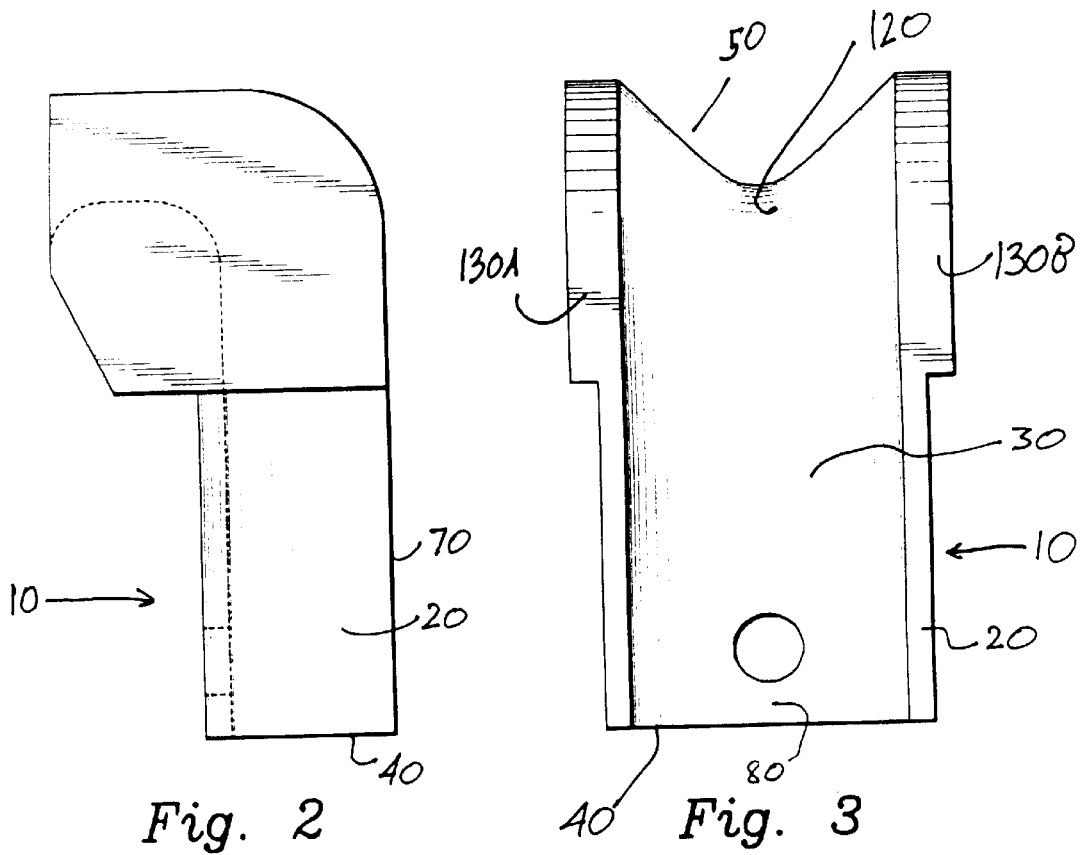
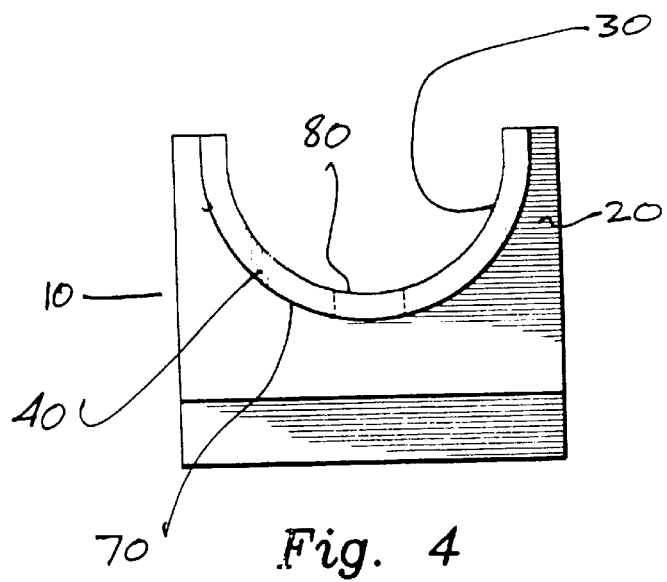

DEVICE FOR FACILITATING THREADING OF ELECTRICAL CABLE THROUGH A PIPE

BACKGROUND OF INVENTION AND DISCUSSION OF PRIOR ART

The subject invention relates to devices that that are adapted to help thread and pull electrical cable or wire through an opening in a pipe member. Devices of this type minimize the potential problem of the outer surface of the electrical cable scraping or wearing against the circumferential end edges of the opening of the pipe as the electrical cable is being pulled and threaded into the pipe interior. The device involves an improved structure for facilitating the process of moving the electrical cable or wiring into and through the pipe interior.

More specifically, in the process of threading electrical cable through open pipe, cable is drawn or pulled through an open pipe with the cable being pulled initially through the open end of the pipe. As the electrical wire or cable is pulled through the open end of the pipe, into the interior of the pipe, the circumferential surface of the electrical wire is drawn with some degree of force against the circumferential edges of the pipe opening. In the process, the outer surface of the electrical wire or cable is frayed or otherwise becomes damaged in the process.

Yet another problem that is encountered in the process of drawing electrical cable through the interior of a pipe is that is important to center the cable as much as possible as it passes through the pipe interior. This centering of the cable adds significantly to the efficiency of the process involved of moving electrical wire into the pipe for protection purposes.

Many devices have been conceived to improve the efficiency of the process of inserting and drawing electrical cable or wire through pipes. Some of these devices include an insert member to permit the cable to be drawn up into the pipe so that the cable does not touch the circumference of the pipe opening as it is drawn inwardly into the pipe interior. One such device is a pipe insert member that has a roller affixed at the end, over which roller the cable is drawn into the pipe interior to facilitate the wire movement. Other similar devices have been conceived and used in this endeavor. However, notwithstanding the existence and usage of such devices, many are cumbersome to use, inefficient, and costly to manufacture.

The subject invention is conceived to overcome these variant problems in order to provide an improved device for such process, and the following objects of the subject invention are directed accordingly.

OBJECTS

By reason of the foregoing, the following are objects of the subject invention:

It is an object of the subject invention is to provide an improved apparatus for improving the process of threading wire through a pipe;

It is an object of the invention to provide an improved structure adapted to improve the ease with which the cable of any type is drawn through the interior of a pipe;

Another object of the subject invention is to provide an improved structure to help prevent fraying of wire as it is drawn into the hollow interior of a protective pipe member;

Another object of the subject invention is to provide a device to help facilitate the process of drawing electrical cable through a pipe in a manner to prevent and minimize the wear of the outer surface of the cable as it is pulled through the open end of the pipe;

Yet another object of the subject invention is to provide means to improve the process of drawing electrical cable through pipe;

Yet another object of the subject invention is to provide an apparatus that functions to help prevent wear on electrical cable as it is being pulled through a pipe;

Still another purpose of the subject invention is to provide a device to facilitate the movement of any type of strand, irrespective of its components or functions, through an opening into an enclosed area;

Other objects of the subject invention will become apparent from a reading of the following descriptions taken in conjunction with the claims.

BRIEF DESCRIPTION OF THE DRAWINGS

In the drawings:

FIG. 2 is a side elevational view of the subject invention;

FIG. 3 is a top elevational view of the subject invention;

FIG. 4 is an end elevational view of the subject invention;

DESCRIPTION OF GENERAL EMBODIMENT

Figure 1:
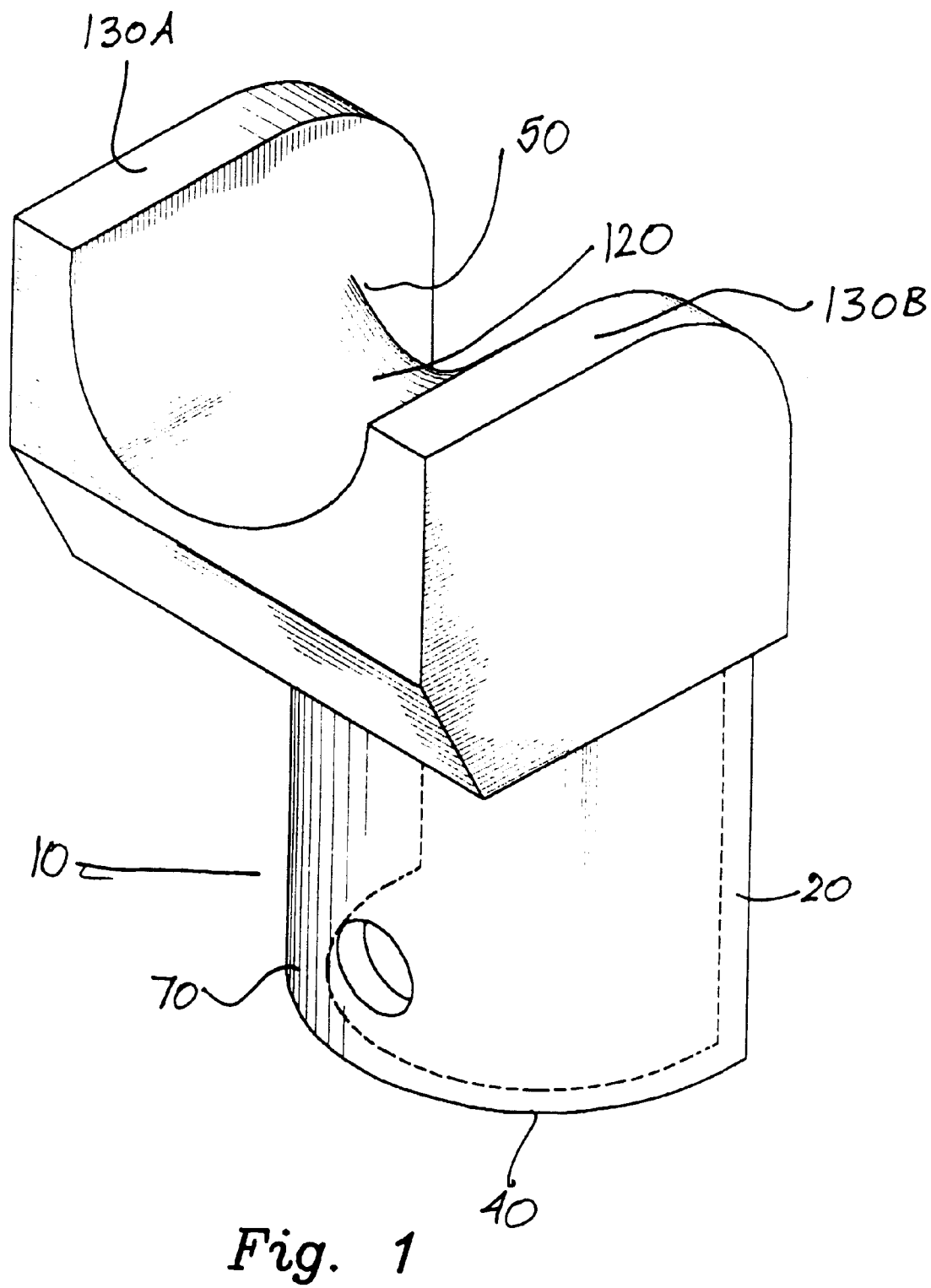
FIG. 1 is a perspective view of the subject invention.

The invention herein is an improved structure for facilitating and easing the process of threading electrical lines or cables into and through the interior of a pipe member comprising a longitudinally extending insert member, such insert member having a rounded undersurface to fit conformingly into the interior of the pipe member, and further wherein such insert member is provided with a channel on the upper surface with such channel having a rounded bottom, and further where such insert member has an inclined cammed surface on the one end to receive the cable as it moves into the insert member before being drawn into the interior of the pipe member.

In summary, the subject invention is a device that is structured as an insert member, a portion of which is adapted to be inserted into the open end of the pipe into which the electrical cable is to be placed, with such insert portion having an open channel structure on its upper portion to carry the electrical wire as it passes, with the bottom of such insert portion being rounded in a concave manner with the outer end of the insert member having a sloped surface that permits movement of the electrical wire over and through the insert member without having the wire touch the end opening of the pipe in the process.

DESCRIPTION OF PREFERRED EMBODIMENT

In describing the preferred embodiment of the subject invention, it is to be stressed that the description of one preferred embodiment shall not limit the scope of the subject invention as set forth in the claims as appended hereto. Moreover, in describing such preferred embodiment as applying to placement of cables through an electrical pipe, it is to be understood that the subject invention has other applications similar to the one described.

Referring now to the drawings where a preferred embodiment of the subject invention is shown, is a pipe insert member 10 incorporating features of the subject invention. Pipe insert member 10 is shown as having a longitudinally extending member 20 formed as a semicylindrical member having an open upper channel 30 formed into the upper surface thereof The pipe insert member 10 has an insert end 40 and an outer end 50 to receive the wire or cable.

Figure 5:
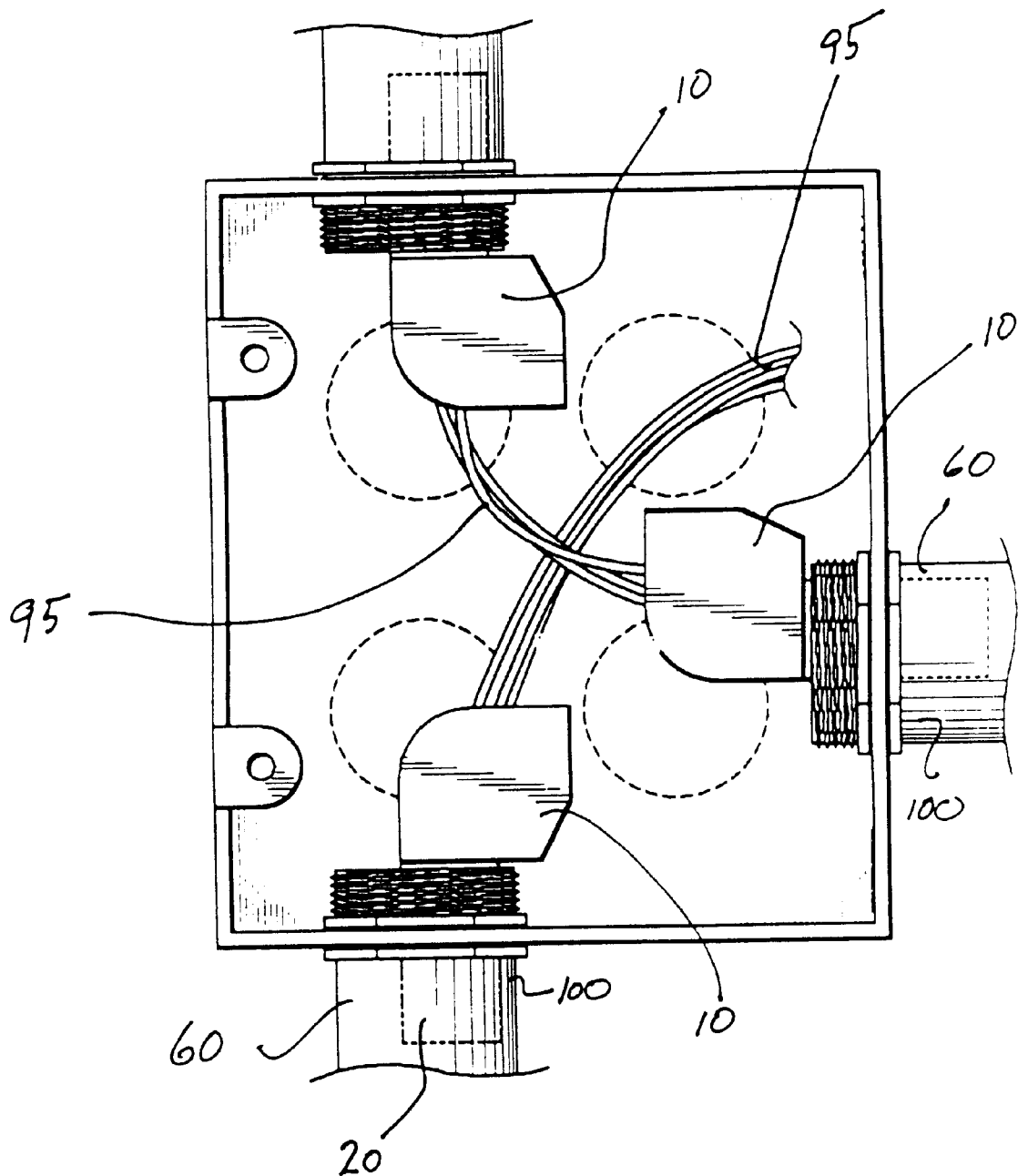
FIG. 5 is an elevational view of the subject invention showing the use of the subject invention in conjunction with pipes used to hold electrical wire in the interior of the pipe.

As can be seen in the end elevational view shown in FIG. 4, the insert end 40 of the pipe insert member 10 is that part that is inserted into an open pipe 60 as seen in FIG. 5. As seen in the end elevational view of FIG. 4 the insert end 40 of the insert member 10 appears to be C-shaped or shaped with the lower surface 70 being semicircular on the lower peripheral portion of such surface, with the inner lower surface 80 of the channel 30 being correspondingly rounded in a C-shaped configuration as viewed in such cross sectional configuration. More specifically, the longitudinally extending member 20 has a convex shaped lower surface 70 which is rounded and curved symmetrically longitudinally along such lower surface, as seen. The purpose of providing and structuring such lower surface 70 with a rounded configuration is to permit the lower surface to fit somewhat conformingly into the lower half of the inner longitudinal chamber 100 of the pipe 60, as depicted in FIG. 5. Moreover, it is preferable that the lower rounded surface be uniformly rounded along its longitudinal extent to accommodate this aspect.

More specifically, as one views the undersurface of the insert portion 20 from the end elevational view of FIG. 4, the lower surface of the insert member appears to be semicircular from such end view. This semi-circular configuration is consistent as the lower surface of the insert member 10 extends forward from the insert end 40.

Further, the semicircular configuration of the insert portion 20 of the insert member 10, with the longitudinal axis of this semi-cylindrical portion, extends in a lengthwise manner parallel to the longitudinal axis of the insert member 10, providing thereby a rounded convex feature for the undersurface 70 for uniform ease of fitting the insert member into a pipe 60. It is to be stressed, however, that the undersurface 70 may be other than rounded as it extends longitudinally from the insert end to the outer end 50.

As can be seen from the drawings, the upper surface of the insert member 10 is provided with a longitudinally extending depressed channel, which is open on both ends thereof, such longitudinally extending channel preferably extending along the longitudinal axis of the insert member as shown in the drawings.

Thus, in the preferred embodiment of the subject invention, the upper surface of the longitudinally extending member 20 is concave as viewed downwardly, and has a channel member 30 that is indented in the shape of a semi-cylindrical member that is rounded inwardly somewhat substantial to the same extent and configuration as the lower surface member 70. More specifically, the upper portion of the longitudinally extending member 20 is formed as an open channel member 30 that is rounded in a concave manner, with such surface of the channel member being shaped as in a semi-cylindrical manner. This indented rounded configuration of the upper portion of the longitudinally member is rounded in such configuration so as to conformingly and movably receive the bottom surface of a rounded wire or electrical cable member 95 as seen in FIG. 5, with the bottom portion of the cable being adapted to be fitted in a longitudinally manner along the bottom rounded portion of the upper channel 30 to enhance the movement of the wire along such channel.

The rounded configuration of the channel 30 generally corresponds to the rounded features of the bottom surface 70 of the longitudinally extending member 20, although this aspect is not critical to the implementation of the subject invention. Thus, as can be seen in the drawings, the upper channel 30 of the insert member 10 extends longitudinally along the insert member and is rounded in a concave manner as it extends along the upper surface of the insert member 10 and the concave rounded feature of the channel is preferably semi-cylindrical.

In one embodiment of the subject invention, the width of the channel 30, as seen from the upper elevational view, may have a decreasing width as it extends towards the insert end 40. This feature helps center the wire more optimally as it enters the pipe.

In order to accommodate and facilitate the movement of the electrical cable into and through the insert member and into the pipe, the outer end 50 of the insert member 10 has a downwardly tapered sloping surface 120, which has some camming features on such surface. This sloping surface 120 extends at an angle downwardly from the outer limit of the channel 30 to the outer end 50 of the insert member 10 so that electrical cable 95 that is fed up over the sloping surface 120 immediately enters the channel 30 for ultimate entry into the pipe 60. This sloping surface replaces the need for a roller at such outer end 50 of the insert member 10.

As can be seen from the drawings formed on opposing sides of the outer end 50 adjacent to the sloping surface 120 of the insert member 10 are opposing flanking support members 130A and 130B that are substantially rectangular plate members affixed on their inner surface to the outer surface areas of the insert member 10, as seen. More specifically, in the preferred embodiment of the subject invention, the sloping surface 120 is flanked by integrally attached flanking support members 130A and 130B, which help center the insert member and maintain the wire centered and confined as it passes over the sloping surface 120.

As can be seen from the drawings, the insert member 10 is partially inserted into the open end of pipe 60, by placing the inner end 40 thereto into the pipe cavity with the upper channel 30 facing towards the center interior of the pipe 60 with the lower surface 70 of the insert member 10 resting conformingly against the interior cavity 100 of the pipe 60.

Once the insert end 40 of the insert member 10 is placed in the inner cavity 100 of the pipe member 60, as shown in FIG. 5, with the lower surface 70 resting securely and conformingly against the lower portion of the inner surface of the pipe cavity 100, the end portion of an electrical cable is placed on the sloping surface 120 of the insert member 10 and moved up the inclined portion of the sloping surface into the bottom rounded portion of the channel 30 and into the remainder of the pipe cavity 100, and the electrical wire is continuously fed in this manner through the bottom of the channel 30 until the electrical cable 95 is inserted, as intended, through the pipe 60.

What is claimed is:

1. A device for facilitating the insertion of electrical cable into the interior cavity of a pipe comprising:

(a) a longitudinally extending insert member having an insert end and an outer end and having an upper longitudinally extending surface and a lower longitudinally extending surface, said longitudinally extending lower surface being rounded in a semi-cylindrical manner and said upper longitudinally extending surface having a depressed channel on its upper surface, said depressed channel being of convex configuration;

(b) inclined sloping surface means on the outer end of said insert member said sloping surface means being an extension of the depressed channel, and over which depressed channel electrical cable is initially drawn to pass from the first end of the insert member through, the depressed channel to the insert end of the insert member and into the interior cavity of the pipe;

(c) flanking support members integrally disposed on each side of the sloping surface means to guide the electrical cable as it passes upwardly over the sloping surface means into the depressed channel.

2. A device for facilitating the insertion of electrical cable into the cavity of a pipe comprising:

(a) a longitudinally extending insert member having an insert end and an outer end and having an upper longitudinally extending surface and a lower longitudinally extending surface, said longitudinally extending lower surface being rounded in a semi-cylindrical manner and said upper longitudinally extending surface having a longitudinally extending depressed channel on its upper surface; said depressed channel having a reduced width as it extends towards the insert end of the insert member;

(b) inclined sloping surface means adjacent the outer end of said insert member said sloping surface means being an extension of the depressed channel, and over which depressed channel electrical cable is initially drawn to pass from the first end of the insert member through said depressed channel to the insert end of the insert member and into the cavity of the pipe;

(c) flanking support members integrally disposed on each side of the sloping surface means to guide the electrical cable as it passes upwardly over the sloping surface means.

3. A device for insertion of electrical cable into the cavity of a pipe comprising:

(a) a longitudinally extending member having an insert end and an outer end and having an upper longitudinally extending surface and a lower longitudinally extending surface, said longitudinally extending lower surface being rounded in a semi-cylindrical manner and said upper longitudinally extending surface having a depressed channel on its upper surface, said depressed channel being of convex configuration;

(b) inclined sloping surface means on the outer end of said insert member said sloping surface means being an extension of the depressed channel, and over which depressed channel electrical cable is initially drawn to pass from the first end of the insert member through the depressed channel to the insert end of the insert member and into the interior cavity of the pipe;

(c) flanking support members integrally disposed on each side of the sloping surface means to guide the electrical cable as it passes upwardly over the sloping surface means into the depressed channel, said flaking means comprising laterally disposed rectangular members that extend upward from the sloping surface means.

* * * * *